United States Patent Office 3,444,606
Patented May 20, 1969

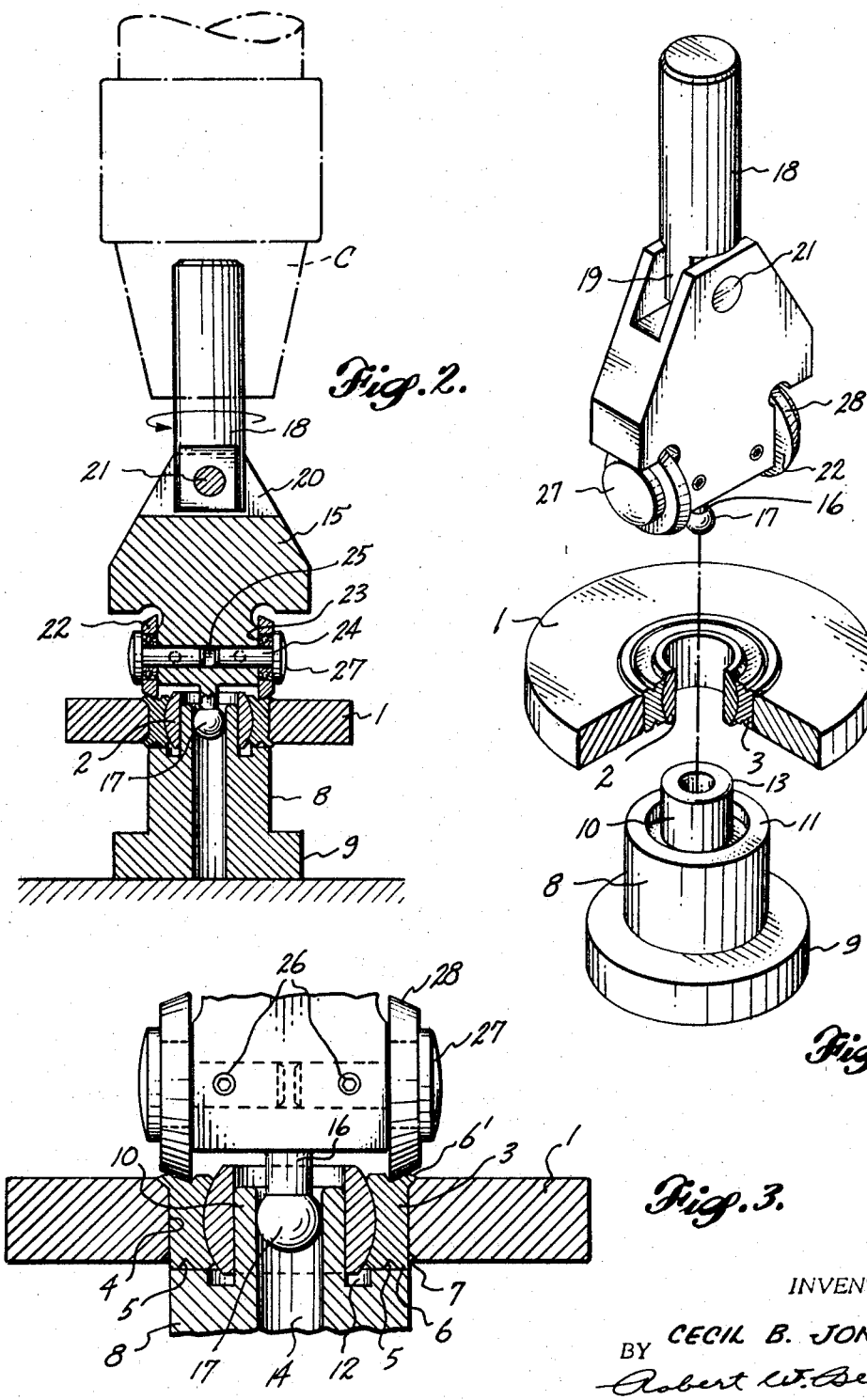

3,444,606
SELF-ALIGNING BEARING-STAKING TOOL
Cecil B. Jones, Kent, Wash.
(515 Lake St., Kirkland, Wash. 98033)
Filed Jan. 23, 1967, Ser. No. 610,933
Int. Cl. B23p *19/00;* B21d *53/10, 3/06*
U.S. Cl. 29—200                                  6 Claims This invention relates to a tool for securing a bearing in a wheel or roller by crimping or staking the margin of the bearing unit to flange it into overlapping relationship to the margin of the bearing-receiving aperture in the wheel or roller.

In the past it has been difficult to set a bearing in the bearing-receiving aperture of a wheel or roller accurately and at the same time securely by a staking operation by an unskilled person.

The principle of the present invention is to provide a tool which can be used effectively by a person who is not an expert mechanic to crimp or stake the margin of a bearing into secure holding relationship to a wheel or roller quickly and consistently.

More particularly it is an object to provide a roller type of bearing-staking tool by the use of which the crimping forces at diametrically opposite locations on the bearing margin will be equalized at all times so that during the staking operation there will be no tendency to tilt the bearing in the bearing-receiving aperture.

An additional object is to provide a bearing-staking tool which will exert even crimping pressure on the bearing margin during its operation so as to produce a uniform flanging action throughout the periphery of the bearing to provide a neat appearance as well as a smooth and effective forging operation.

Still another object is to provide a bearing-staking tool which will accommodate itself to slight irregularities in a bearing without detracting from the effectiveness of its staking operation and without exerting unbalanced stresses on the bearing.

The foregoing objects can be accomplished by providing a bearing-staking tool including a body having a shank which can be secured in a drill press chuck, such shank and body are connected by a knuckle joint to enable the body to tilt slightly relative to the shank even when the tool is engaged with the work. On the lower end of the body are mounted two bevel crimping rollers rotated about a common axis extending perpendicular to the axis of the knuckle joint pivot and also extending transversely of the length of the tool supporting shank. Such crimping rollers are engageable with opposite side portions of a bearing set in the bearing-receiving aperture of a wheel or roller, such bearing is mounted on a suitable jig which is located accurately with respect to the tool body by a locating stem on such body being engaged with a locating aperture in the bearing mounting jig.

FIGURE 1 is a top perspective of the tool, a bearing and wheel assembly and a bearing mounting jig shown in exploded relationship with portions of the wheel and bearing broken away.

FIGURE 2 is a central vertical section through the bearing-staking tool, a wheel and bearing assembly and a bearing mounting jig.

FIGURE 3 shows the bearing-staking tool with parts broken away in elevation, the wheel and bearing assembly and the upper portion of the bearing mounting jig in vertical section, all on an enlarged scale.

The drawings show a typical type of bearing and wheel or roller assembly on which the tool of the present invention can be used. The wheel 1 is simply representative of any type of wheel or roller which may be rather small such as being only a few inches in diameter. The bearing is to be set in a bearing-receiving aperture in the center of said wheel and the periphery of the wheel can be cylindrical, flanged or may be in the form of a sprocket or gear, depending upon the use for which the wheel is intended. In the present description all of such articles are intended to be included within the generic term of a wheel. The bearing can also be of various types such as a plain bearing or an antifriction bearing of the ball or roller type. The only requirement for use of the tool of the present invention is that the margin of the bearing is to be secured to the margin of the wheel's bearing-receiving aperture by crimping or flanging the bearing margin over the margin of the bearing-receiving aperture to secure it in place.

The bearing selected for illustration in the drawings is of the plain self-aligning type including an inner shell 2 having a convex spherical zone exterior seated in the concave spherical zone interior of a saddle 3. Such saddle is to be considered as merely representative of any bearing-mounting ring. Such ring or saddle is inserted into the bearing-receiving aperture 4 of the wheel and preferably these parts are engaged with a light press fit so that they will not fall apart when being handled prior to being locked together by a staking operation.

In each face of the bearing's saddle or mounting ring is a groove 5 concentric with the periphery of the mounting ring and spaced inward somewhat from its periphery. As shown best in FIGURE 3, the grooves are preferably V-grooves and are sufficiently deep to provide an annular rib 6 between the groove and the periphery of the mounting ring which can be crimped radially outward in the staking operation. It is preferred that the edges of the bearing-receiving aperture 4 have chamfered corners 7 over which the ribs 6 can be crimped during the staking operation.

The bearing and wheel assembly can be supported conveniently and accurately during the staking operation by a die or jig 8 having an enlarged base 9 to provide stability. A boss 10 projects upward from the central portion of the jig's upper end and is of a size to fit snugly in the bore of the bearing shell 2 as shown best in FIGURE 3. The mounting ring or saddle of the bearing rests on the shoulder 11 encircling the boss 10. An annular groove 12 may be provided between the base of the boss 10 and the shoulder 11 to receive an end of the bearing shell 2 if it projects axially beyond the adjacent surface of the bearing's mounting ring.

It is desirable for the upper end 13 of the boss to have rounded corners so that the bore of the bearing shell can slide easily onto the boss 10 even though such bore fits the boss with a close fit. The inner corner of the boss at the entrance to the central locating bore 14 of the jig can be rounded similarly. The body 15 of the bearing-staking tool has a stem 16 projecting downward from it. The end of this stem is formed as an enlarged ball tip 17 having a diameter substantially equal to the diameter of the locating bore 14 in the jig so that the ball tip can be inserted into the jig's locating bore with a snug fit. The stem 16 thus constitutes a pilot stem for locating the body of the bearing-staking tool accurately with respect to the bearing saddle 3.

To perform the staking operation the tool has an elongated shank 18 which is secured in a drill press chuck C as indicated in FIGURE 2. The tool shank is joined to the tool body by a knuckle joint so that the shank and body can tilt relatively at least to a small degree about the axis of the knuckle joint pivot. The lower end of the shank has its opposite sides cut away to form a tenon 19 fitting in a groove 20 in the top of the tool body. The tenon and bifurcations of the tool body at opposite sides of the groove are secured together by a pivot pin 21 which preferably is secured in the body bifurcations with a press fit and the tenon 19 may fit the pivot pin rather loosely.

On the lower portion of the tool body 15 is a pair of bevel crimping rollers 22 is mounted with the rollers of the pair being located at opposite sides of the tool body. These rollers are mounted on antifriction bearings 23 held in place by independent stub shafts 24 which are received respectively in opposite ends of a cross bore 25 in the lower portion of the tool body, the two shafts 24 are thus disposed with their axes in alignment and the cross bore axis is disposed perpendicular to the axis of the knuckle joint pivot 21. Both of these axes extend transversely of the length of the shank 18. The stub shafts 24 are secured in opposite ends of the bore 25 by set screws 26 which may be of the Allen type, heads 27 on the outer ends of the stub shafts retaining the bearings 23 and rollers 22 on the tool body.

The width of the lower end of the tool body 15 parallel to the stub axles 24 is of a width such that, when such axles are secured in the body in positions to allow the rollers 22 to rotate freely, the larger ends of the frustoconical roller surfaces 28 will fit in diametrically opposite portions of a V-groove 5 in one side of the bearing mounting ring 3. Such location of the bevel crimping rollers is shown in FIGURE 3. Also this figure shows that the angle of inclination of the frustoconical surface 28 of each crimping roller is less than the angle between the outer wall of each V-groove 5 and the face of the bearing mounting ring 3 in which such groove is formed. Consequently, when the bevel crimping rollers are pressed into the V-grooves of the bearing mounting ring, the annular ribs 6 are crimped or flanged outwardly into overlapping relationship with the chamfered corners 7 of the wheel 1.

In performing the bearing-staking operation with the tool of the present invention, the shank 18 of such tool is secured in the drill press chuck C. The central bore of the wheel and bearing assembly can be fitted over the boss 10 of the mounting jig 8. The base 9 of such jig can then be slid on the drill press table to dispose the jig beneath the tool in raised position. Next, the drill press chuck is lowered and the position of the jig is adjusted until the pilot stem ball tip 17 enters the locating bore 14 in the center of the jig. Continued downward movement of the drill press chuck will slide the pilot stem ball tip down the locating bore until the peripheries 28 of the bevel crimping rollers engage the annular rib 6 in the upper surface of the bearing mounting ring 3.

With the tool in this position relative to the bearing mounting ring 3, the drill chuck C can be rotated as it is forced downward. Passage of the peripheries 28 of the bevel crimping rollers 22 against the inner side of the annular rib 6 will forge or crimp such rib so that it forms the flange 6' shown best in FIGURE 3 extending from the groove 5 over the inner margin of the wheel 1 and is pressed down tightly onto the chamfer 7. Simultaneously pressure of the frustoconical roller surfaces 28 into the groove 5 will expand the end portion of the bearing mounting ring 3 somewhat to press tightly against the wall of the bearing-receiving aperture 4.

When one of the annular ribs 6 has been flanged in the manner described, the bearing-staking tool will be raised and the wheel end bearing assembly will be inverted from the position shown in FIGURE 3 and again placed on the jig 8. The staking operation described above is then repeated on the other side of the bearing mounting ring as indicated in FIGURE 2 so that the bearing will be locked securely to the wheel on both sides. Formation of the flange 6' from the rib 6 on each side of the bearing mounting ring will require that the rollers 22 ride on the rib 6 for at least several rotations of the tool. Supporting of the bearing mounting ring by the jig 8 will ensure that such ring is supported accurately, but the provision of the knuckle joint between the stem 18 and the body 15 will enable these two elements to tilt relatively so that the two rollers 22 will bear with equal force on diametrically opposite portions of the rib 6 even though such rib may be somewhat uneven or the axis of the shank 18 secured in the drill press chuck C may not be precisely perpendicular to the face of the rib 6.

The rolling action of the crimping rollers 22 will affect a progressive and a very smooth flanging action on the rib 6 so that when the staking operation is completed the exposed surface of the flange will be even, smooth and neat. Moreover, equalization of the crimping pressure between the two rollers 22 will prevent all possibility of the staking operation exerting unbalanced pressure on opposite portions of the wheel 1 which might tend to tilt such wheel relative to the bearing mounting ring 3 so as to displace the axis of the bearing mounting ring and of the bearing-receiving aperture 4 from precise coincidence.

I claim:

1. A self-aligning bearing-staking tool comprising a body, an elongated shank extending upward from said body for reception in a drill press chuck, means connecting said shank and said body for relative tilting about an axis extending transversely of the length of said shank, and a pair of bevel crimping rollers carried by the lower portion of said body for rotation about a common axis extending transversely of the length of said shank.

2. The self-aligning bearing-staking tool defined in claim 1, in which the means connecting the shank and the body for relative tilting include a knuckle joint, and the rotative axis of the bevel crimping rollers extends perpendicular to the axis of the knuckle joint.

3. The self-aligning bearing-staking tool defined in claim 1, in which the tool body has a bore extending through its lower portion which extends transversely of the length of the shank, and axle means received in such bore and supporting the bevel crimping rollers.

4. The self-aligning bearing-staking tool defined in claim 3, in which the axle means includes two independent cantilever stub axles received in opposite ends of the bore respectively carrying the bevel crimping rollers.

5. The self-aligning bearing-staking tool defined in claim 1, a bearing mounting jig for supporting a bearing to be engaged by the tool and having a locating bore therein disposed concentrically of a bearing mounted thereby, and a pilot stem projecting from the body oppositely from the shank for reception in such locating bore.

6. The self-aligning bearing-staking tool defined in claim 5, in which the stem has an enlarged ball tip fittable closely in the body locating bore.

References Cited

UNITED STATES PATENTS

| 2,645,954 | 7/1953 | Pfingston | 72—126 X |
| 2,898,671 | 8/1959 | Heim. | |
| 2,970,558 | 2/1961 | Albertini. | |
| 3,357,084 | 12/1967 | Colautti et al. | |
| 3,369,285 | 2/1968 | Heim. | |
| 3,069,940 | 12/1962 | Koehler | 72—126 |

THOMAS H. EAGER, *Primary Examiner.*

U.S. Cl. X.R.

29—149.5; 72—126